US012217719B2

(12) United States Patent
Li

(10) Patent No.: US 12,217,719 B2
(45) Date of Patent: Feb. 4, 2025

(54) PIXEL DRIVING CIRCUIT AND DISPLAY DEVICE

(71) Applicant: TCL CHINA STAR OPTOELECTRONICS TECHNOLOGY CO., LTD., Shenzhen (CN)

(72) Inventor: Yan Li, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 288 days.

(21) Appl. No.: 17/272,244

(22) PCT Filed: Dec. 31, 2020

(86) PCT No.: PCT/CN2020/142180

§ 371 (c)(1),
(2) Date: Sep. 25, 2023

(87) PCT Pub. No.: WO2022/141409

PCT Pub. Date: Jul. 7, 2022

(65) Prior Publication Data

US 2024/0038195 A1 Feb. 1, 2024

(51) Int. Cl.
*G09G 3/36* (2006.01)
*G09G 3/34* (2006.01)

(52) U.S. Cl.
CPC ......... *G09G 3/3688* (2013.01); *G09G 3/3413* (2013.01); *G09G 3/3677* (2013.01); *G09G 2320/0626* (2013.01)

(58) Field of Classification Search
CPC ........... H10K 59/00-95; H10K 59/121; H10K 59/131; H10K 71/00; G09G 2300/0426; G09G 3/3648; G09G 3/3677; G09G 2310/0286; G09G 2320/0209; G09G 2320/0242; G09G 3/36; G09G 3/3216; G09G 3/3696
See application file for complete search history.

(56) References Cited

U.S. PATENT DOCUMENTS

| | | | | |
|---|---|---|---|---|
| 2009/0213046 A1* | 8/2009 | Nam | G09G 3/3233 345/76 |
| 2020/0278585 A1* | 9/2020 | Kajita | G06F 3/0446 |

FOREIGN PATENT DOCUMENTS

| | | |
|---|---|---|
| CN | 103392199 A | 11/2013 |
| CN | 108389548 A | 8/2018 |
| CN | 108520716 A | 9/2018 |
| CN | 110459164 A | 11/2019 |
| CN | 111369944 A | 7/2020 |
| CN | 112017589 A | 12/2020 |
| KR | 20150039468 A | 4/2015 |

* cited by examiner

*Primary Examiner* — Sanjiv D. Patel
(74) *Attorney, Agent, or Firm* — PV IP PC; Wei Te Chung

(57) ABSTRACT

The present application provides a pixel driving circuit and a display device. The pixel driving circuit includes a scanning signal line and a data signal line. A pixel driving circuit unit includes at least two cascaded units, wherein the pixel driving circuit unit is configured to change a connection number of cascaded units that are connected to the data signal line and a light emitting diode, to adjust a brightness of the light emitting diode so as to effectively improve gray level of displayed picture and display quality.

15 Claims, 4 Drawing Sheets

PIXEL DRIVING CIRCUIT AND DISPLAY DEVICE

RELATED APPLICATIONS

This application is a Notional Phase of PCT Patent Application No. PCT/CN2020/142180 having international filing date of Dec. 31, 2020, which claims the benefit of priority of Chinese Patent Application No. 202011606917.8 filed on Dec. 30, 2020. The contents of the above applications are all incorporated by reference as if fully set forth herein in their entirety.

TECHNICAL FIELD

The present application relates to the field of display panel display technology, and in particular, to a pixel driving circuit and a display device.

BACKGROUND

With continuous improvement of technology, display technology of liquid crystal display device has been well developed, and display devices have been widely applied in various electronic devices.

Liquid crystal displays (LCDs) have been widely used for having many advantages, such as compact body, power efficiency, and zero emission of radiation. Liquid crystal display devices are also applied in diversified functions and usages. For traditional liquid crystal display devices, a backlight is often cold cathode fluorescent lamp, but the cold cathode fluorescent lamp backlight has poor color reduction ability, low luminous efficiency, low gray level, and unsatisfactory picture display effect. Therefore, backlight technology in traditional liquid crystal display devices is inadequate for baseline requirements in modern display device specifications. Light emitting diode (LED) based backlight technology has been developed, wherein a special driving circuit is required to provide driving voltages for light emitting diodes to illuminate normally. However, display effect of display panels with the existing driving circuit is not ideal, rendering low gray levels in the displayed quality. Moreover, with increasing requirements for improved display quality, higher refresh frequency of the display panels, and demands for large size and high performance, the existing driving circuit is unable to render higher bit gray levels display required by the current design goals, which hinders overall performances of the display panels.

It is therefore desirable to propose solutions to the problems in the prior art.

SUMMARY

Technical Problem

As described, the display panel in the existing liquid crystal display device cannot achieve high-bit gray levels when displaying, therefore the quality and performance of the display device is not ideal enough to meet the emerging expectations.

Technical Solution

To solve the aforementioned problem, an embodiment of the present application provides a pixel driving circuit and a display device capable of rendering high-bit gray levels as required, while increasing display quality, display effect, and overall performance of the display devices.

An embodiment of the present application provides a pixel driving circuit and a display device to improve the connection number of gray levels, display quality and display effect of the liquid crystal display device, and to improve the overall performance of the display device.

To solve the aforementioned technical problem, embodiments of the solution are provided as follows.

In the first aspect of the embodiment of the present application, a pixel driving circuit is provided, and the pixel driving circuit comprises:

a scanning signal line;

at least two data signal lines arranged with the scanning signal lines in an interleaved manner;

a light emitting diode, having a first end electrically coupled to a voltage source; and a pixel driving circuit unit, comprising at least two cascaded units, each cascaded unit having a first electrode electrically coupled to a corresponding data signal line, and a second electrode electrically coupled to a second end of the light emitting diode; wherein the pixel driving circuit unit may be adaptable for changing a connection number of the cascaded units being connected to the data signal lines and the light emitting diode, such that a brightness of the light emitting diode may be adjusted accordingly.

Wherein each cascaded unit may comprise a switching thin film transistor and a driving thin film transistor; a source of the switching thin film transistor may be electrically coupled to the corresponding data signal line; a gate of the switching thin film transistor may be electrically coupled to the scanning signal line; a drain of the switching thin film transistor may be electrically coupled to a gate of the driving thin film transistor, and the switching thin film transistor and the driving thin film transistor comprise at least one of N-type thin film transistors or P-type thin film transistors.

According to an embodiment of the present application, the at least two cascaded units share the scanning signal line, and the scanning signal line may be connected to the gate of the switching thin film transistor in each cascaded unit;

The at least two cascaded units share a capacitor having one end grounded, and another end connected to the drain of the switching thin film transistor and the gate of the driving thin film transistor in each cascaded unit.

According to an embodiment of the present application, the pixel driving circuit unit may comprise a first cascaded unit, a second cascaded unit, a third cascaded unit, and a fourth cascaded unit. The first cascaded unit may comprise a first switching thin film transistor and a first driving thin film transistor; wherein a drain of the first switching thin film transistor may be coupled to a gate of the first driving thin film transistor; a drain of the first driving thin film transistor may be coupled to the second end of the light emitting diode; and a source of the first driving thin film transistor may be grounded; The second cascaded unit may comprise a second switching thin film transistor and a second driving thin film transistor, wherein a drain of the second switching thin film transistor may be coupled to a gate of the second driving thin film transistor; a drain of the second driving thin film transistor may be coupled to the second end of the light emitting diode, and a source of the second driving thin film transistor may be grounded.

The third cascaded unit may comprise a third switching thin film transistor and a third driving thin film transistor, wherein a drain of the third switching thin film transistor may be coupled to a gate of the third driving thin film transistor, a drain of the third driving thin film transistor may be coupled to the second end of the light emitting diode, and a source of the third driving thin film transistor may be grounded.

The fourth cascaded unit may comprise a fourth switching thin film transistor and a fourth driving thin film transistor, wherein a drain of the fourth switching thin film transistor may be coupled to a gate of the fourth driving thin film transistor; a drain of the fourth driving thin film transistor may be electrically coupled to the second end of the light emitting diode; and a source of the fourth driving thin film transistor may be grounded.

According to an embodiment of the present application, the first driving thin film transistor, the second driving thin film transistor, the third driving thin film transistor and the fourth driving thin film transistor are subsequently different.

According to an embodiment of the present application, width-to-length ratios of channels in the first, second, third and fourth driving thin film transistors are different.

According to an embodiment of the present application, the pixel driving circuit further may comprise a first data signal line, a second data signal line, a third data signal line and a fourth data signal line. The first data signal line may be coupled to a source of the first switching thin film transistor; the second data signal line may be coupled to a source of the second switching thin film transistor; the third data signal line may be coupled to a source of the third switching thin film transistor, and the fourth data signal line may be coupled to a source of the fourth switching thin film transistor.

According to an embodiment of the present application, the light emitting diode may comprise a first light emitting diode, a second light emitting diode, a third light emitting diode, and a fourth light emitting diode each respectively coupled to the second electrodes of different cascaded units.

The second aspect of the embodiment of the present application provides a pixel driving circuit, which may comprise:

a scanning signal line;

at least two data signal lines arranged with the scanning signal line in an interleaved manner;

a light emitting diode, having a first end electrically coupled to a voltage source; and a pixel driving circuit unit, comprising at least two cascaded units, each cascaded unit having a first electrode electrically coupled to a corresponding data signal line, and a second electrode electrically coupled to a second end of the light emitting diode; wherein the pixel driving circuit unit may be adaptable for changing a connection number of the cascaded units being connected to the data signal lines and the light emitting diode, such that a brightness of the light emitting diode may be adjusted accordingly.

According to an embodiment of the present application, each cascaded unit may comprise a switching thin film transistor and a driving thin film transistor; a source of the switching thin film transistor may be electrically coupled to the corresponding data signal line; a gate of the switching thin film transistor may be electrically coupled to the scanning signal line; a drain of the switching thin film transistor may be electrically coupled to a gate of the driving thin film transistor; a drain of the driving thin film transistor may be electrically coupled to the second end of the light emitting diode, and a source of the driving thin film transistor may be grounded.

According to an embodiment of the present application, each cascaded unit further may comprise a capacitor having one end grounded, and another end electrically coupled to the drain of the switching thin film transistor and the gate of the driving thin film transistor.

According to an embodiment of the present application, at least two cascaded units share the same scanning signal line, and the scanning signal line may be connected to the gate of the switching thin film transistor in each cascaded unit.

The at least two cascaded units share the scanning signal line, and the scanning signal line may be connected to the gate of the switching thin film transistor in each cascaded unit; and the at least two cascaded units share the capacitor having one end grounded, and another end electrically coupled to the drain of the switching thin film transistor and the gate of the driving thin film transistor in each cascaded unit.

According to an embodiment of the present application, the pixel driving circuit unit may comprise a first cascaded unit, a second cascaded unit, a third cascaded unit, and a fourth cascaded unit. The first cascaded unit may comprise a first switching thin film transistor and a first driving thin film transistor; wherein a drain of the first switching thin film transistor may be coupled to a gate of the first driving thin film transistor; a drain of the first driving thin film transistor may be coupled to the second end of the light emitting diode; and a source of the first driving thin film transistor may be grounded;

The second cascaded unit may comprise a second switching thin film transistor and a second driving thin film transistor, wherein a drain of the second switching thin film transistor may be coupled to a gate of the second driving thin film transistor; a drain of the second driving thin film transistor may be coupled to the second end of the light emitting diode, and a source of the second driving thin film transistor may be grounded.

The third cascaded unit may comprise a third switching thin film transistor and a third driving thin film transistor, wherein a drain of the third switching thin film transistor may be coupled to a gate of the third driving thin film transistor, a drain of the third driving thin film transistor may be coupled to the second end of the light emitting diode, and a source of the third driving thin film transistor may be grounded.

The fourth cascaded unit may comprise a fourth switching thin film transistor and a fourth driving thin film transistor, wherein a drain of the fourth switching thin film transistor may be coupled to a gate of the fourth driving thin film transistor; a drain of the fourth driving thin film transistor may be electrically coupled to the second end of the light emitting diode; and a source of the fourth driving thin film transistor may be grounded.

According to an embodiment of the present application, the first driving thin film transistor, the second driving thin film transistor, the third driving thin film transistor and the fourth driving thin film transistor are subsequently different.

According to an embodiment of the present application, width-to-length ratios of channels in the first, second, third and fourth driving thin film transistors are different.

According to an embodiment of the present application, the pixel driving circuit further may comprise a first data signal line, a second data signal line, a third data signal line and a fourth data signal line. The first data signal line may be coupled to a source of the first switching thin film transistor; the second data signal line may be coupled to a source of the second switching thin film transistor; the third data signal line may be coupled to a source of the third switching thin film transistor, and the fourth data signal line may be coupled to a source of the fourth switching thin film transistor.

According to an embodiment of the present application, the light emitting diode may comprise a first light emitting diode, a second light emitting diode, a third light emitting diode, and a fourth light emitting diode each respectively coupled to the second electrodes of different cascaded units.

According to the third aspect of the embodiment of the present application, a display device including a display panel and a backlight source may be provided. The backlight may be connected to the display panel, configured to provide backlight for the display panel; and the display panel may comprise a pixel driving circuit comprising:

A scanning signal line;

At least two data signal lines arranged with the scanning signal line in an interleaved manner;

A light emitting diode, having a first end electrically coupled to a voltage source; and A pixel driving circuit unit, comprising at least two cascaded units, each cascaded unit having a first electrode electrically coupled to a corresponding data signal line, and a second electrode electrically coupled to a second end of the light emitting diode; and wherein the pixel driving circuit unit may be adaptable for changing a connection number of the cascaded units being connected to the data signal lines and the light emitting diode, such that a brightness of the light emitting diode may be adjusted accordingly.

According to an embodiment of the present application, each cascaded unit may comprise a switching thin film transistor and a driving thin film transistor. A source of the switching thin film transistor may be electrically coupled to the corresponding data signal line; a gate of the switching thin film transistor may be electrically coupled to the scanning signal line; a drain of the switching thin film transistor may be electrically coupled to a gate of the driving thin film transistor; a drain of the driving thin film transistor may be electrically coupled to the second end of the light emitting diode, and a source of the driving thin film transistor may be grounded.

According to an embodiment of the present application, each cascaded unit further may comprise a capacitor, one end of which may be grounded, and the other end of which may be electrically coupled to the drain of the switching thin film transistor and the gate of the driving thin film transistor.

According to an embodiment of the present application, the at least two cascaded units share the scanning signal line, and the scanning signal line may be connected to the gate of the switching thin film transistor in each cascaded unit;

The at least two cascaded units share the capacitor having one end grounded, and another end electrically coupled to the drain of the switching thin film transistor and the gate of the driving thin film transistor in each cascaded unit.

Beneficial Effect of Invention

To sum up, the beneficial effects of the embodiments of the present application are as follows.

Advantageous Effect

The pixel driving circuit in the embodiment of the present application includes a pixel driving circuit unit and a light emitting diode, wherein the pixel driving circuit unit includes at least two cascaded units, each cascaded unit has a first electrode electrically coupled to a corresponding data signal line, and a second electrode electrically coupled to the second end of the light emitting diode. When the light emitting diode emits light, the connection number of the cascaded units is controlled to adjust the brightness of the light emitting diode, so as to improve the gray level of the display panel, simplify the panel structure, and improve the display quality and display effect of the display device.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The following description of the embodiments is made with reference to the additional diagrams to illustrate specific embodiments for which the present disclosure can be implemented.

An embodiment of the present application provides a pixel driving circuit and a display device. The pixel driving circuit integrates multiple thin film transistors and light emitting diodes in one pixel driving circuit unit, so as to improve the gray level of the display panel, reduce the production cost of the display device, and effectively improve the display quality and display effect of the display device.

Figure 1:
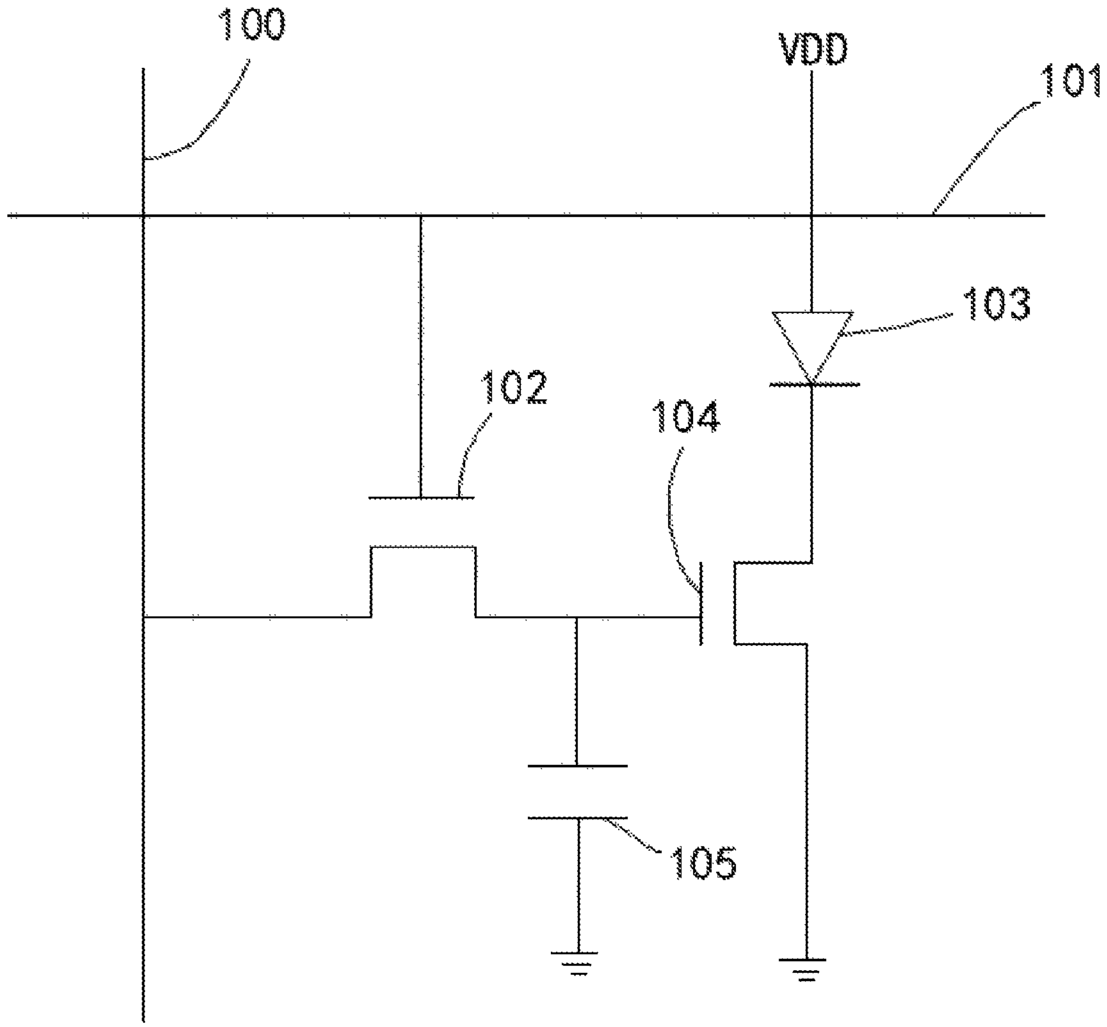
FIG. 1 is a structural diagram of a pixel driving circuit in the prior art.

As shown in FIG. 1, a structural diagram of a pixel driving circuit in the prior art is presented. An embodiment of the present application provides a pixel driving circuit comprising a data signal line 100 and a scanning signal line 101 arranged with the data signal line 100 in an interleaved manner. Meanwhile, the pixel driving circuit also includes a switching thin film transistor 102, a driving thin film transistor 104, and a capacitor 105.

Wherein, a gate of the switching thin film transistor 102 is electrically coupled to the scanning signal line 101, and a source of the switching thin film transistor 102 is electrically coupled to the data signal line 100. A drain of the switching thin film transistor 102 is electrically coupled to a gate of the driving thin film transistor 104, and a drain of the driving thin film transistor 104 is electrically coupled to a first end of a light emitting diode 103. One end of the capacitor 105 is electrically coupled to the drain of the switching thin film transistor 102 and the gate of the driving thin film transistor 104, and the other end of the capacitor 105 is grounded.

It can be seen from a coupling condition of the pixel driving circuit shown in FIG. 1 that when a display panel is displaying images, a scanning speed thereof is increased. The scanning signal line 101 inputs a high voltage level signal to control and turn on the switching thin film transistor 102, and the data signal line 100 transmits data signal to the gate of the driving thin film transistor 104 and the capacitor 105 through the switching thin film transistor 102. Thereafter, the switching thin film transistor 102 is turned off. Due to a storage function of the capacitor 105, a gate voltage of the driving thin film transistor 104 can maintain the data signal voltage, so that the driving thin film transistor 104 remains on, driving the light emitting diode 103 located along the line to illuminate.

A conventional pixel driving circuit can better fit a conventional display panel; however, the conventional pixel driving circuit is not suitable for requirements of large size and high display specifications, such as a display panel with high gray level.

Figure 2:
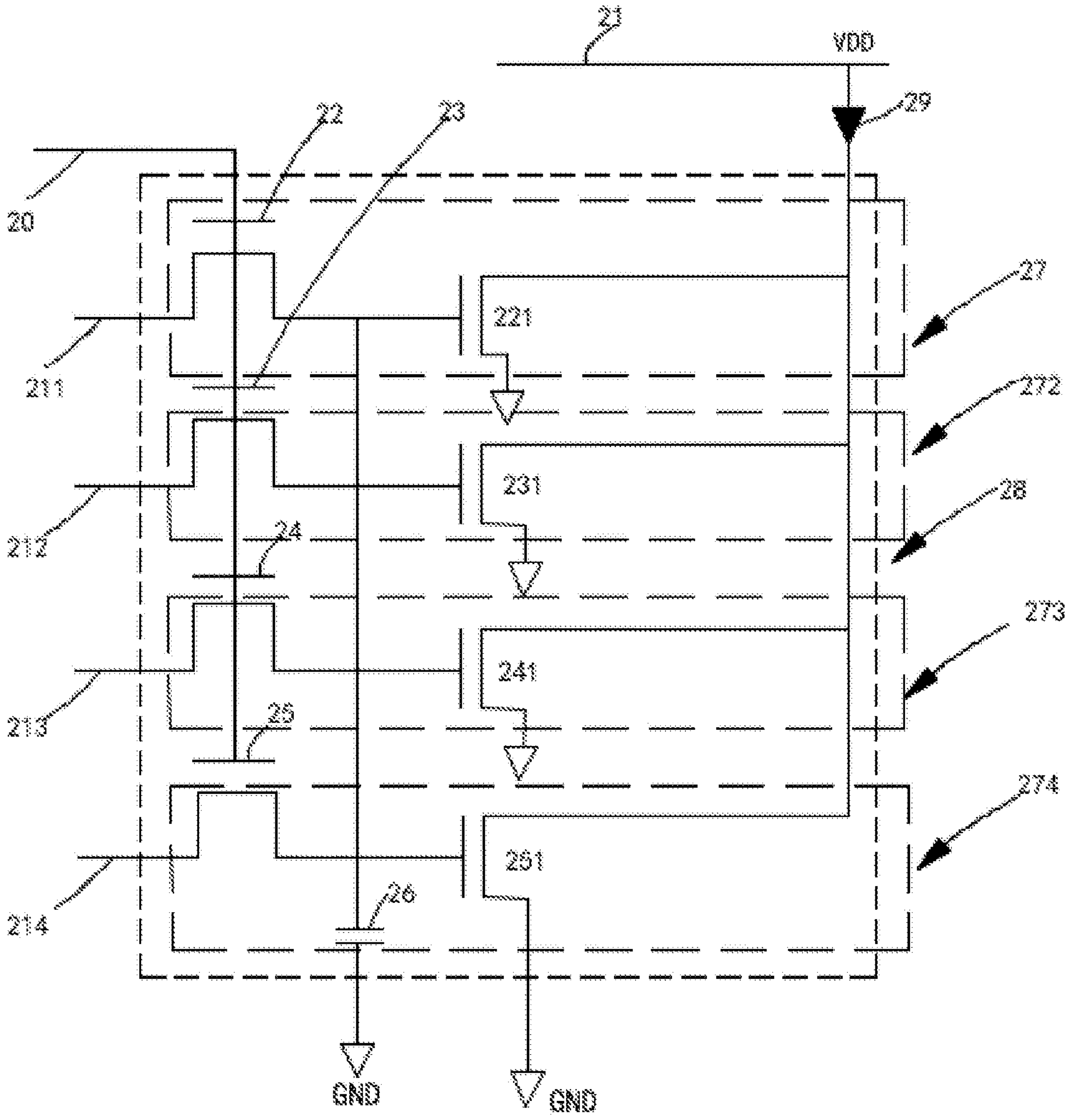
FIG. 2 is a structural diagram of a pixel driving circuit according to an embodiment of the present application.

As shown in FIG. 2, a structural diagram of a pixel driving circuit according to an embodiment of the present application is presented. The pixel driving circuit according to the embodiment includes a scanning signal line 20, at least two data signal lines, a power supply voltage line 21, a light emitting diode 29, and a pixel driving circuit unit 28. The at least two data signal lines are arranged with the scanning signal line 20 in an interleaved manner. A first end of the light emitting diode 29 is electrically coupled to the power supply voltage line 21, the power supply voltage line 21 is configured to provide voltage for the light emitting diode 29, and the pixel driving circuit unit 28 is electrically coupled to the scanning signal line 20, the data signal line and the second end of the light emitting diode 29 at the same time, thus forming a complete pixel driving circuit structure. The pixel driving circuit unit 28 adjusts and controls the light emitting diode 29 according to the control signal, and turns the light emitting diode 29 on or off.

Specifically, at least two data signal lines and the scanning signal line 20 are arranged in an interleaved manner, for example, the at least two data signal lines and the scanning signal line 20 are perpendicular or intercrossed to each other to define a plurality of pixel units.

Furthermore, the pixel driving circuit unit 28 further includes at least two cascaded units, each of which has a first electrode electrically coupled to the corresponding data signal line, and a second electrode electrically coupled to the second end of the light emitting diode 29. The pixel driving circuit unit 28 is configured to change a connection number of cascaded units that are connected to the data signal line and the light emitting diode 29, so as to adjust the brightness of the light emitting diode 29. Therefore, by adjusting the functional characteristics of the light emitting diode in the display panel, the gray level of the display panel and the display effect of the display panel can be improved. Preferably, the connection number of gray levels of the display panel can be increased by controlling the connection number of the cascaded units, that is, by controlling a total combination number of the thin film transistors in the driving circuit.

A plurality of thin film transistors may be included in the pixel driving circuit unit 28. Multiple thin film transistors are repetitively arranged in the pixel driving circuit unit 28. Specifically, each cascaded unit includes a switching thin film transistor and a driving thin film transistor. The source of the switching thin film transistor is electrically coupled to the corresponding data signal line, the gate of the switching thin film transistor is electrically coupled to the corresponding scanning signal line, the drain of the switching thin film transistor is electrically coupled to the gate of the corresponding driving thin film transistor, and the drain of the driving thin film transistor is electrically connected to the second end of the same light emitting diode, while the source of the driving thin film transistor is grounded.

Specifically, in each cascaded unit, the data signal transmitted by the data signal line is passed through the switching thin film transistor to the gate and the capacitor of the driving thin film transistor, and thereafter, the switching thin film transistor is switched off. Under the storage function of the capacitor, the gate voltage of the driving thin film transistor can maintain the data signal voltage, so that the driving thin film transistor is kept in the on state. When the scanning signal line corresponding to the light emitting diode 29 is turned on, the light emitting diode 29 begins to emit light. Therefore, the embodiment of the present application is able to simultaneously provide data signals to a plurality of different cascaded units. By controlling the connection number of the cascaded units, different amount of current can be supplied to the light emitting diode 29 to achieve the purpose of different gray levels.

Alternatively, each cascaded unit may be provided with a scanning signal line electrically coupled to the gate of the switching thin film transistor. In this way, however, a number of wiring may be increased and that could cause a reduction in production yield. Therefore, in the embodiment of the present application, at least two cascaded units may share one scanning signal line 20, wherein in each cascaded unit, the scanning signal line 20 is connected to the gate of the switching thin film transistor. In this way, one scanning signal line 20 can be configured to simultaneously turn on the switching thin film transistors in multiple cascaded units, thus simplifying the structure of the pixel driving circuit and reducing wiring.

Meanwhile, each cascaded unit also includes a capacitor 26. In one cascaded unit, one end of the capacitor 26 is coupled to both the drain of the switching thin film transistor and the gate of the driving thin film transistor. The other end of the capacitor 26 is grounded. When the switching thin film transistor is turned off, due to the storage function of capacitor 26, the gate voltage of the driving thin film transistor can maintain the data signal voltage, making the driving thin film transistor be in the on state, so that the light emitting diode is driven thereafter.

Furthermore, at least two cascaded units can share the same capacitor 26, and one end of the capacitor 26 is grounded. The other end of the capacitor 26 is connected to the drain of the switching thin film transistor in each cascaded unit and the gate of the driving thin film transistor. In this way, one capacitor 26 can be configured to simultaneously store the gate voltage of the driving thin film transistor for multiple cascaded units, thus simplifying the structure of the pixel driving circuit and reducing the wiring.

In a specific embodiment, as shown in FIG. 2, the pixel driving circuit unit 28 includes a first cascaded unit 27, a second cascaded unit 272, a third cascaded unit 273, and a fourth cascaded unit 274. The data signal line includes a first data signal line 211, a second data signal line 212, a third data signal line 213, and a fourth data signal line 214.

In the first cascaded unit 27, a first switching thin film transistor 22 and a first driving thin film transistor 221 are provided. A second switching thin film transistor 23 and a second driving thin film transistor 231 are arranged in the second cascaded unit 272, a third switching thin film transistor 24 and a third driving thin film transistor 241 are arranged in the third cascaded unit 273. A fourth switching thin film transistor 25 and a fourth driving thin film transistor 251 are arranged in the fourth cascaded unit 274.

Wherein, the gate of the first switching thin film transistor 22 is electrically coupled to the scanning signal line 20. The drain of the first switching thin film transistor 22 is coupled to the gate of the first driving thin film transistor 221. The drain of the first driving thin film transistor 221 is coupled to the second end of the light emitting diode 29, and the source of the first driving thin film transistor 221 is grounded. Meanwhile, one end of the capacitor 26 is electrically coupled to the drain of the first switching thin film transistor 22 and the gate of the first driving thin film transistor 221.

The gate of the second switching thin film transistor 23 is electrically coupled to the scanning signal line 20. The drain of the second switching thin film transistor 23 is electrically coupled to the gate of the second driving thin film transistor 231, and the drain of the second driving thin film transistor 231 is electrically coupled to the second end of the light emitting diode 29. The source of the second driving thin film transistor 231 is grounded. Furthermore, one end of the capacitor 26 is electrically coupled to the drain of the second switching thin film transistor 23 and the gate of the second driving thin film transistor 231.

The gate of the third switching thin film transistor 24 is coupled to the scanning signal line 20, and the drain of the third switching thin film transistor 24 is coupled to the gate of the third driving thin film transistor 241. The drain of the third driving thin film transistor 241 is coupled to the second end of the light emitting diode 29, and the source of the third driving thin film transistor 241 is grounded. Meanwhile, one end of the capacitor 26 is electrically coupled to the drain of the third switching thin film transistor 24 and the gate of the third driving thin film transistor 241.

The gate of the fourth switching thin film transistor 25 is electrically coupled to the scanning signal line 20. The drain of the fourth switching thin film transistor 25 is electrically coupled to the gate of the fourth driving thin film transistor 251. The drain of the fourth driving thin film transistor 251 is electrically coupled to the second end of the light emitting diode 29. The source of the fourth driving thin film transistor 251 is grounded. Furthermore, one end of the capacitor 26 is coupled to the drain of the fourth switching thin film transistor and the gate of the fourth driving thin film transistor 251.

Meanwhile, the first data signal line 211 is electrically coupled to the source of the first switching thin film transistor 22. The second data signal line 212 is electrically coupled to the source of the second switching thin film transistor 23, the third data signal line 213 is electrically coupled to the source of the third switching thin film transistor 24, and the fourth data signal line 214 is electrically coupled to the source of the fourth switching thin film transistor 25. The voltage of the data signals applied by the above data signal lines are the same.

In an embodiment of the present application, a plurality of switching thin film transistors and driving thin film transistors may be implemented. In the embodiment of an integrated pixel driving circuit unit 28, the drain electrodes of the first driving thin film transistor 221, the second driving thin film transistor 231, the third driving thin film transistor 241 and the fourth driving thin film transistor 251 are simultaneously coupled to the other end of the same light emitting diode 29. Meanwhile, the pixel driving circuit unit forms a metal oxide semiconductor (MOS) transistor structure, which provides the scanning signal for the pixel driving circuit unit through the scanning signal line 20, and controls the on and off state of each switch thin film transistor, so as to effectively improve the performance of the driving circuit and improve the gray level of the display panel.

In a further embodiment of the present application, the corresponding driving thin film transistors in different cascaded units may be completely same or different. Specifically, the first driving thin film transistor 221, the second driving thin film transistor 231, the third driving thin film transistor 241, and the fourth driving thin film transistor 251 may be same or partially identical, and the thin film transistor in the embodiment of the present application may include N-type or P-type thin film transistors.

In a design stage, the width-to-length ratios W/L of the channels of driving thin film transistors in different cascaded units can be same or different. When the width-to-length ratios W/L of the channels in each driving thin film transistor are the same, it is inherent that the driving thin film transistors are the same, and conversely, the channels designed with different width-to-length ratios W/L yield different driving thin film transistors.

When the width-to-length ratio W/L of the channel of the driving the thin film transistor has a larger value, a driving current in the pixel driving circuit is large. Conversely, when the width-to-length ratio W/L of the channel driving the thin film transistor has a smaller value, the driving current in the pixel driving circuit is small. Thus, the display device according to an embodiment of the present application can provide different working currents for the light emitting diodes for the purpose of adjusting the gray level of the display screen in greater detail and improving the display effect of the display panel.

Figure 3:
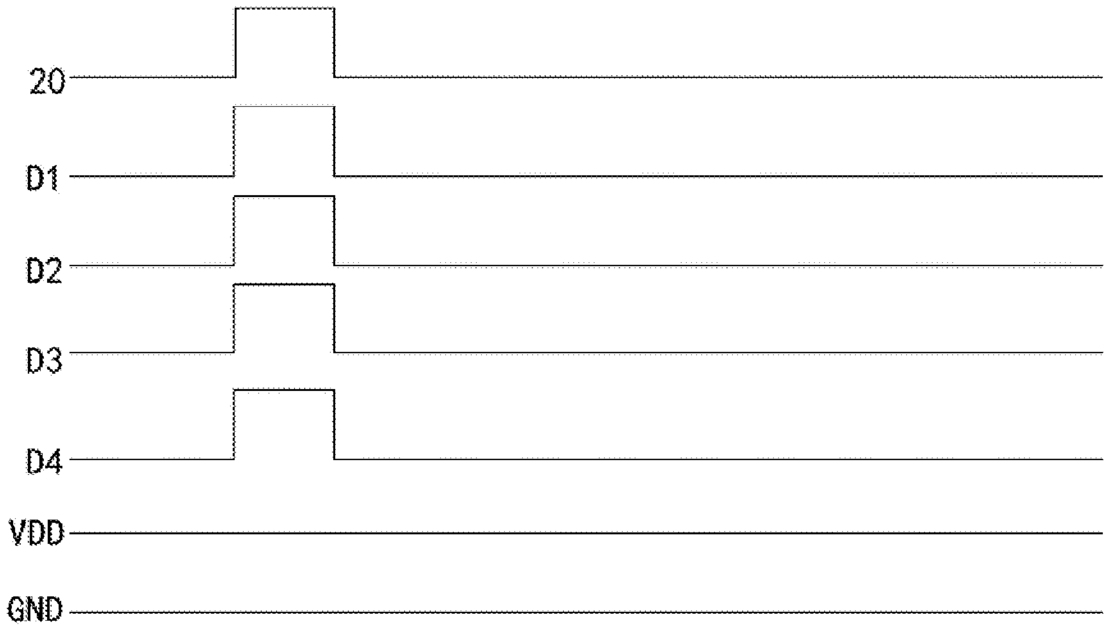
FIG. 3 is a pixel driving circuit sequence diagram of the pixel driving circuit according to an embodiment of the present application.

Specifically, FIG. 3 is a pixel driving circuit sequence diagram of the pixel driving circuit according to an embodiment of the present application. In combination with the embodiments in FIG. 2 and FIG. 3, the signal lines D1, D2, D3, and D4 in FIG. 3 respectively provide data signals for the first switching thin film transistor 22, the second switching thin film transistor 23, the third switching thin film transistor 24, and the fourth switching thin film transistor 25 respectively, and the signal lines D1, D2, D3, and D4 are correspond to the first data signal line 211, the second data signal line 212, the third data signal line 213, and the fourth data signal line 214, respectively.

For the first driving thin film transistor 221 and the second driving thin film transistor 231, a width-to-length ratio W2/L2 of the channel in the second driving thin film transistor 231 is twice the width-to-length ratio W/L of the channel in the first driving thin film transistor 221, that is, W2/L2=2W/L.

When a high voltage level is applied to the second switching thin film transistor 23 while the rest of the switching thin film transistors are applied with a low voltage level, the second driving thin film transistor 231 is turned on. Meanwhile, the current through the light emitting diode 29 is denoted as I2.

When a high voltage level is applied to the first switching thin film transistor 22 while the other switching thin film transistors are applied with a low voltage level, the current passing through the light emitting diode 29 is I.

When a high voltage level is applied to both the first switching thin film transistor 22 and the second switching thin film transistor 23, while the rest of the switching thin film transistors are applied with low voltage levels, the current passing through the light emitting diode 29 is I2+I=3I because W2/L2=2W/L.

The light emission of the light emitting diode 29 responds differently to different working currents, therefore, the gray levels rendered by the display panel can be accurately tuned by adjusting the working current of the light emitting diode 29.

In the embodiment of the present application, when the light emitting diode is emitting light, the data signal line and the light emitting diode are connected by changing the connection number of cascaded units in the light emitting transistor, so as to improve the number of gray levels in the display panel. By controlling the connection number of cascaded units, a connection number of driving thin film transistors in the corresponding cascaded units also changes, and the working current of the light emitting transistor is changed so as to improve the gray level of the display panel and effectively improve the display effect of the display panel.

Figure 4:
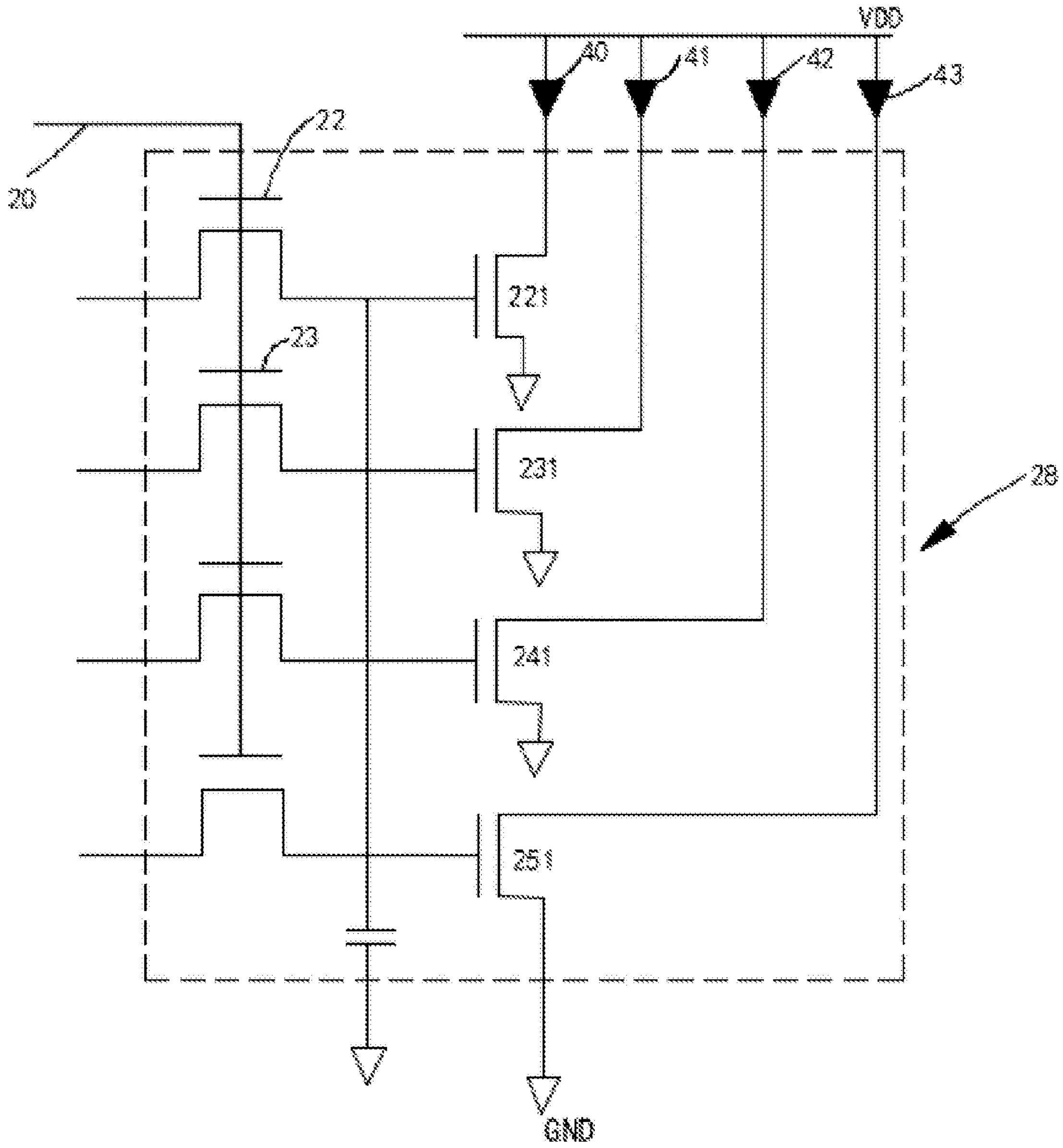
FIG. 4 is a structural diagram of another pixel driving circuit according to an embodiment of the present application.

FIG. 4 is a structural diagram of a pixel driving circuit according to another embodiment of the present application. In combination with the pixel driving circuit in in the embodiment of FIG. 2, a plurality of light emitting diodes are implemented, wherein each light emitting diode is coupled to a different cascaded unit, that is, each light emitting diode is electrically coupled to a drain electrode of a corresponding driving thin film transistor, so as to effectively improve the gray levels presented by the display device, and yield quality display effects on the display panel.

Specifically, in the embodiment, the light emitting diode includes a first light emitting diode 40, a second light emitting diode 41, a third light emitting diode 42, and a fourth light emitting diode 43. One end of the first light emitting diode 40 is coupled to the drain of the first driving thin film transistor 221, the other end of the first light emitting diode 40 is coupled to the supply voltage VDD. One end of the second light emitting diode 41 is coupled to the drain of the second driving thin film transistor 231, the other end of the second light emitting diode 41 is coupled to the supply voltage VDD. One end of the third light emitting diode 42 is coupled to the drain of the third driving thin film transistor 241. The other end of the third light emitting diode 42 is coupled to the power supply voltage VDD. One end of the fourth light emitting diode 43 is coupled to the fourth driving thin film transistor 251, and the other end of the fourth light emitting diode 43 is coupled to the power supply voltage VDD.

When the light emitting diodes are active, the light emitting diodes corresponding to different cascaded units are controlled to emit light. Specifically, when the driving circuit is operational, different cascaded units can be selected according to the actual needs to make the corresponding driving thin film transistor work normally and drive corresponding light emitting diodes to emit light, so as to control the gray level of the display panel.

Preferably, when the first light emitting diode 40, the second light emitting diode 41, the third light emitting diode 42, and the second light emitting diode 41 emit light, the maximum gray level can be achieved, that is, all the driving thin film transistors corresponding to the driving circuit are driven. If the gray level of the display device is reduced, the corresponding one or several light emitting diodes cannot emit light by matching different driving thin film transistor combinations, so as to achieve the purpose of reducing the gray level of the display panel. Therefore, the embodiment of the present application can adjust the gray level more precisely with better adjustment effect, and the display effect of the display device is also improved.

Furthermore, in an embodiment of the present application, by integrating a plurality of thin film transistors in the same pixel driver in the pixel driving circuit unit, a whole MOS transistor is formed, and then the whole MOS transistor is deployed in the display panel, which effectively simplifies the structure and process of the display device. Meanwhile, the design can effectively improve the gray level of the display device, which can be more accurately controlled, rendering greater display effects.

Preferably, the embodiment of the present application also provides a display device, which includes a display panel and a backlight source. The display panel is coupled to the backlight source to provide backlight for the display panel. The display panel includes the pixel driving circuit according to an embodiment of the present application. When the screen is displayed, the display quality and display effect of the screen of the display device are improved.

A pixel driving circuit and a display device according to an embodiment of the present application are described in detail. In the present application, specific examples are applied to explain the principle and implementation mode of the present application, and the description of the above embodiments is only used to help understand the technical solution and its core idea of the present application; those skilled in the art should understand that they can still modify the technical solution recorded in the above-mentioned embodiments, or replace some of the equivalent technical features. The modifications or substitutions do not make the essence of the corresponding technical solution out of the scope of the technical solutions of the embodiments of the present application.

What is claimed is:

1. A pixel driving circuit, comprising:

a scanning signal line;

at least two data signal lines arranged with the scanning signal line in an interleaved manner;

a light emitting diode, having a first end electrically coupled to a voltage source; and a pixel driving circuit unit, comprising at least two cascaded units, each cascaded unit having a first electrode electrically coupled to a corresponding data signal line, and a second electrode electrically coupled to a second end of the light emitting diode; wherein the pixel driving circuit unit is configured to change a connection number of the cascaded units being connected to the data signal lines and the light emitting diode, such that a brightness of the light emitting diode is adjusted accordingly; wherein:

each cascaded unit comprises a switching thin film transistor and a driving thin film transistor;

a source of the switching thin film transistor is electrically coupled to the corresponding data signal line;

a gate of the switching thin film transistor is electrically coupled to the corresponding scanning signal line;

a drain of the switching thin film transistor is electrically coupled to a gate of the corresponding driving thin film transistor; and the switching thin film transistor and the driving thin film transistor comprise at least one of N-type thin film transistors or P-type thin film transistors;

wherein the at least two cascaded units share the scanning signal line, and the scanning signal line is connected to the gate of the switching thin film transistor in each cascaded unit; and the at least two cascaded units share a capacitor having one end grounded and another end connected to the drain of the switching thin film transistor and the gate of the driving thin film transistor in each cascaded unit.

2. The pixel driving circuit according to claim 1, wherein:

the pixel driving circuit unit comprises a first cascaded unit, a second cascaded unit, a third cascaded unit, and a fourth cascaded unit;

the first cascaded unit comprises a first switching thin film transistor and a first driving thin film transistor; wherein:

a drain of the first switching thin film transistor is coupled to a gate of the first driving thin film transistor;

a drain of the first driving thin film transistor is coupled to the second end of the light emitting diode; and a source of the first driving thin film transistor is grounded;

the second cascaded unit comprises a second switching thin film transistor and a second driving thin film transistor, wherein:

a drain of the second switching thin film transistor is coupled to a gate of the second driving thin film transistor;

a drain of the second driving thin film transistor is coupled to the second end of the light emitting diode, and a source of the second driving thin film transistor is grounded;

the third cascaded unit comprises a third switching thin film transistor and a third driving thin film transistor, wherein:

a drain of the third switching thin film transistor is coupled to a gate of the third driving thin film transistor, a drain of the third driving thin film transistor is coupled to the second end of the light emitting diode, and a source of the third driving thin film transistor is grounded; and the fourth cascaded unit comprises a fourth switching thin film transistor and a fourth driving thin film transistor, wherein:

a drain of the fourth switching thin film transistor is coupled to a gate of the fourth driving thin film transistor;

a drain of the fourth driving thin film transistor is electrically coupled to the second end of the light emitting diode; and a source of the fourth driving thin film transistor is grounded.

3. The pixel driving circuit according to claim 2, wherein the first driving thin film transistor, the second driving thin film transistor, the third driving thin film transistor, and the fourth driving thin film transistor are different.

4. The pixel driving circuit according to claim 3, wherein width-to-length ratios of channels in the first, second, third, and fourth driving thin film transistors are different.

5. The pixel driving circuit according to claim 2, wherein:

the pixel driving circuit further comprises a first data signal line, a second data signal line, a third data signal line, and a fourth data signal line;

the first data signal line is coupled to a source of the first switching thin film transistor;

the second data signal line is coupled to a source of the second switching thin film transistor;

the third data signal line is coupled to a source of the third switching thin film transistor; and the fourth data signal line is coupled to a source of the fourth switching thin film transistor.

6. The pixel driving circuit according to claim 1, wherein the light emitting diode comprises a first light emitting diode, a second light emitting diode, a third light emitting diode, and a fourth light emitting diode each respectively coupled to a second electrode of different cascaded units.

7. A pixel driving circuit, comprising:

a scanning signal line;

at least two data signal lines arranged with the scanning signal line in an interleaved manner;

a light emitting diode, having a first end electrically coupled to a voltage source; and a pixel driving circuit unit, comprising at least two cascaded units, each cascaded unit having a first electrode electrically coupled to a corresponding data signal line, and a second electrode electrically coupled to a second end of the light emitting diode;

wherein the pixel driving circuit unit is configured to change a connection number of the cascaded units being connected to the data signal lines and the light emitting diode, such that a brightness of the light emitting diode is adjusted accordingly, wherein the light emitting diode comprises a first light emitting diode, a second light emitting diode, a third light emitting diode, and a fourth light emitting diode each respectively coupled to a second electrode of different cascaded units.

8. The pixel driving circuit according to claim 7, wherein:

each cascaded unit comprises a switching thin film transistor and a driving thin film transistor;

a source of the switching thin film transistor is electrically coupled to the corresponding data signal line;

a gate of the switching thin film transistor is electrically coupled to the corresponding scanning signal line;

a drain of the switching thin film transistor is electrically coupled to a gate of the corresponding driving thin film transistor;

a drain of the driving thin film transistor is electrically coupled to the second end of the light emitting diode; and a source of the driving thin film transistor is grounded.

9. The pixel driving circuit according to claim 8, wherein each cascaded unit further comprises a capacitor having one end grounded and another end electrically coupled to the drain of the switching thin film transistor and the gate of the driving thin film transistor.

10. The pixel driving circuit according to claim 9, wherein:

the at least two cascaded units share the scanning signal line, and the scanning signal line is connected to the gate of the switching thin film transistor in each cascaded unit; and the at least two cascaded units share the capacitor having one end grounded and another end electrically coupled to the drain of the switching thin film transistor and the gate of the driving thin film transistor in each cascaded unit.

11. The pixel driving circuit according to claim 7, wherein:

the pixel driving circuit unit comprises a first cascaded unit, a second cascaded unit, a third cascaded unit, and a fourth cascaded unit;

the first cascaded unit comprises a first switching thin film transistor and a first driving thin film transistor; wherein:

a drain of the first switching thin film transistor is coupled to a gate of the first driving thin film transistor;

a drain of the first driving thin film transistor is coupled to the second end of the light emitting diode; and a source of the first driving thin film transistor is grounded;

the second cascaded unit comprises a second switching thin film transistor and a second driving thin film transistor, wherein:

a drain of the second switching thin film transistor is coupled to a gate of the second driving thin film transistor;

a drain of the second driving thin film transistor is coupled to the second end of the light emitting diode, and a source of the second driving thin film transistor is grounded;

the third cascaded unit comprises a third switching thin film transistor and a third driving thin film transistor, wherein:

a drain of the third switching thin film transistor is coupled to a gate of the third driving thin film transistor, a drain of the third driving thin film transistor is coupled to the second end of the light emitting diode, and a source of the third driving thin film transistor is grounded; and the fourth cascaded unit comprises a fourth switching thin film transistor and a fourth driving thin film transistor, wherein:

a drain of the fourth switching thin film transistor is coupled to a gate of the fourth driving thin film transistor;

a drain of the fourth driving thin film transistor is electrically coupled to the second end of the light emitting diode; and a source of the fourth driving thin film transistor is grounded.

12. The pixel driving circuit according to claim 11, wherein the first driving thin film transistor, the second driving thin film transistor, the third driving thin film transistor, and the fourth driving thin film transistor are different.

13. The pixel driving circuit according to claim 12, wherein width-to-length ratios of channels in the first, second, third, and fourth driving thin film transistors are different.

14. The pixel driving circuit according to claim 11, wherein:

the pixel driving circuit further comprises a first data signal line, a second data signal line, a third data signal line, and a fourth data signal line;

the first data signal line is coupled to a source of the first switching thin film transistor;

the second data signal line is coupled to a source of the second switching thin film transistor;

the third data signal line is coupled to a source of the third switching thin film transistor;

the third data signal line is coupled to a source of the third switching thin film transistor; and the fourth data signal line is coupled to a source of the fourth switching thin film transistor.

15. A display device comprising a display panel and a backlight source, wherein:

the backlight source is connected to the display panel, configured to provide backlight for the display panel;

the display panel comprises a pixel driving circuit comprising:

a scanning signal line;

at least two data signal lines arranged with the scanning signal line in an interleaved manner;

a light emitting diode, having a first end electrically coupled to a voltage source; and a pixel driving circuit unit, comprising at least two cascaded units, each cascaded unit having one end electrically coupled to a corresponding data signal line, and another end electrically coupled to a second end of the light emitting diode; and wherein the pixel driving circuit unit is configured to change a connection number of the cascaded units being connected to the data signal lines and the light emitting diode, such that a brightness of the light emitting diode is adjusted accordingly;

wherein each cascaded unit comprises a switching thin film transistor and a driving thin film transistor, and a capacitor having one end grounded and another end;

a source of the switching thin film transistor is electrically coupled to the corresponding data signal line;

a gate of the switching thin film transistor is electrically coupled to the corresponding scanning signal line;

a drain of the switching thin film transistor is electrically coupled to a gate of the corresponding driving thin film transistor and the another end of the capacitor;

a drain of the driving thin film transistor is electrically coupled to the second end of the light emitting diode; and a source of the driving thin film transistor is grounded;

wherein the at least two cascaded units share the scanning signal line, and the scanning signal line is connected to the gate of the switching thin film transistor in each cascaded unit; and the at least two cascaded units share the capacitor having one end grounded and another end electrically coupled to the drain of the switching thin film transistor and the gate of the driving thin film transistor in each cascaded unit.

* * * * *